United States Patent
Onodera et al.

(10) Patent No.: US 9,899,662 B2
(45) Date of Patent: Feb. 20, 2018

(54) METHOD FOR PRODUCING ELECTRODES FOR ALL-SOLID BATTERY AND METHOD FOR PRODUCING ALL-SOLID BATTERY

(71) Applicant: Hitachi, Ltd., Tokyo (JP)

(72) Inventors: Taigo Onodera, Tokyo (JP); Tadashi Fujieda, Tokyo (JP); Jun Kawaji, Tokyo (JP)

(73) Assignee: Hitachi, Ltd., Tokyo (JP)

(*) Notice: Subject to any disclaimer, the term of this patent is extended or adjusted under 35 U.S.C. 154(b) by 382 days.

(21) Appl. No.: 14/685,179

(22) Filed: Apr. 13, 2015

(65) Prior Publication Data

US 2015/0295224 A1    Oct. 15, 2015

(30) Foreign Application Priority Data

Apr. 14, 2014 (JP) ................. 2014-082434

(51) Int. Cl.
*H01M 4/04* (2006.01)
*H01M 4/1391* (2010.01)
*H01M 10/052* (2010.01)
*H01M 10/0562* (2010.01)

(52) U.S. Cl.
CPC ....... *H01M 4/0471* (2013.01); *H01M 4/0433* (2013.01); *H01M 4/1391* (2013.01); *H01M 10/052* (2013.01); *H01M 10/0562* (2013.01); *Y02T 10/7011* (2013.01)

(58) Field of Classification Search
CPC ............ H01M 4/0471; H01M 10/052; H01M 10/0562; H01M 4/0433; H01M 4/1391; H01M 10/0585; Y02T 10/7011; Y02E 60/122
See application file for complete search history.

(56) References Cited

FOREIGN PATENT DOCUMENTS

JP    2003-059492 A    2/2003
JP    2013-134825 A    7/2013

*Primary Examiner* — Basia Ridley
*Assistant Examiner* — Heng Chan
(74) *Attorney, Agent, or Firm* — Volpe and Koenig, P.C.

(57) ABSTRACT

Disclosed herein is a method for producing an electrode includes a step of reducing lithium-vanadium oxide by heating in reducing gas, a step of causing the reduced lithium-vanadium oxide to deliquesce, a step of mixing the deliquesced lithium oxide with an active material so as to prepare an electrode mixture, and a step of making the electrode mixture into an electrode by virtue of molding after heat treatment to the electrode mixture. The method for producing an all-solid battery further includes a step of bonding the thus-made electrode to a solid electrode layer in such a way that the solid electrode layer is interposed between the electrode and either of cathode and anode to be paired with the electrode.

14 Claims, 2 Drawing Sheets

METHOD FOR PRODUCING ELECTRODES FOR ALL-SOLID BATTERY AND METHOD FOR PRODUCING ALL-SOLID BATTERY

BACKGROUND OF THE INVENTION

1. Field of the Invention

The present invention relates to a method for producing electrodes for all-solid battery and another method for producing all-solid battery.

2. Description of the Related Art

Secondary batteries are now used as the power source for recently prevailing machinery and tools, such as portable personal computers, mobile telephone terminals and other communication tools, domestic storage systems, hybrid automobiles, and electric vehicles. Among such secondary batteries are lithium-ion secondary batteries which have a higher energy density than other secondary batteries, such as nickel-hydrogen storage batteries. However, lithium-ion secondary batteries, which contain a flammable organic solvent as the liquid electrolyte, need a safety device to prevent firing and bursting caused by overcurrent due to short circuit. Moreover, on account of the necessity for such a safety device, they are sometimes restricted in selection of battery materials and design of battery structure.

To cope with the foregoing situation, efforts have been being made to develop all-solid batteries which contain a solid electrolyte in place of a liquid electrolyte. The all-solid batteries have an advantage that they only need a simpler safety device because of the absence of flammable organic solvent. Consequently, they are regarded as batteries superior in production cost and productivity. Moreover, they are expected to be promising batteries which are safe and yet have a high capacity and a high output because they can be easily connected in series owing to the structure including paired electrode layers (or cathode layer and anode layer) and a solid electrolyte layer held between such electrode layers.

The all-solid batteries are known to have the internal resistance which is greatly affected by the contact resistance that occurs between adjacent particles of an active material (for battery reactions) or between adjacent particles of the active material and solid electrolyte. A change in internal resistance results from the active material changing in volume after repeated charging and discharging. The active material with volume change then becomes loose in contact with the active material and solid electrolyte, which tends to increase internal resistance and decrease capacity. To tackle this problem, there have been proposed techniques to prevent the increase in internal resistance.

Regarding such techniques, JP-2003-059492-A discloses a lithium secondary battery in which at least either of the cathode and anode has active material particles which are coated with a coating layer containing a conductive material and a lithium ion conductive inorganic solid electrolyte.

JP-2013-134825-A discloses a composite active material having an active material and a coating layer formed thereon, the coating layer containing a carbonaceous substance and an ion-conductive oxide. The coating layer has a surface in which the concentration of carbon is no less than 17.0 atm %.

SUMMARY OF THE INVENTION

For the all-solid battery to increase in capacity by virtue of reduction in the contact resistance between adjacent particles of an active material (for battery reactions) or between adjacent particles of the active material and solid electrolyte, it seems necessary to improve contact between particles and to bring particles into close contact with one another, thereby minimizing gaps between particles. However, the techniques disclosed in JP-2003-059492-A and JP-2013-134825-A employ active material particles coated with a solid electrolyte for production of electrodes, and this causes many active material particles to merely come into point-to-point contact. Moreover, the disclosed techniques give rise to electrodes having many gaps between respective active material particles. Consequently, they still involve difficulties in improving both contact and energy density. Thus, it is an object of the present invention to provide a method for producing electrodes for all-solid battery and another method for producing all-solid battery, the all-solid battery improving in contact between active material particles and having reduced internal resistance and increased discharge capacity.

The present invention to solve the foregoing problems is configured as defined in the claims.

According to the present invention, there is provided a method for producing electrodes for all-solid battery and another method for producing all-solid battery, the all-solid battery improving in contact between active material particles and having reduced internal resistance and increased discharge capacity.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

The following is a detailed description of the all-solid battery, the electrodes contained therein, and the method for production thereof according to the embodiment of the present invention.

The all-solid battery according to the embodiment is of a bulk type in which a solid electrolyte is involved in ionic conduction from one electrode to another. The electrode has the electrode layer which is composed mainly of active material particles in an aggregate form. The all-solid battery includes a pair of electrodes, cathode and anode, and a solid electrolyte layer interposed between the cathode and the anode. Either of the paired electrodes thereof has an electrode layer containing an active material and a solid electrolyte.

Figure 1:
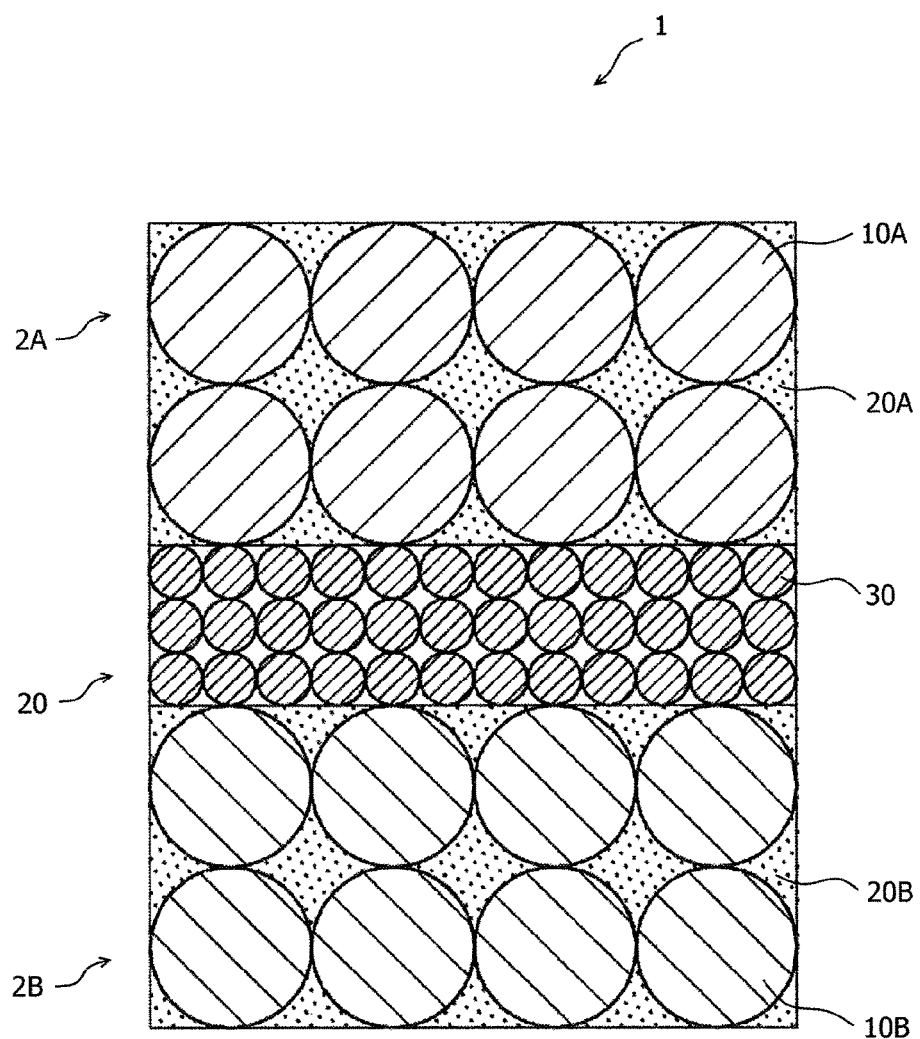
FIG. 1 is a schematic sectional view showing one example of the structure of the all-solid battery according to an embodiment of the preset invention.
Figure 2:
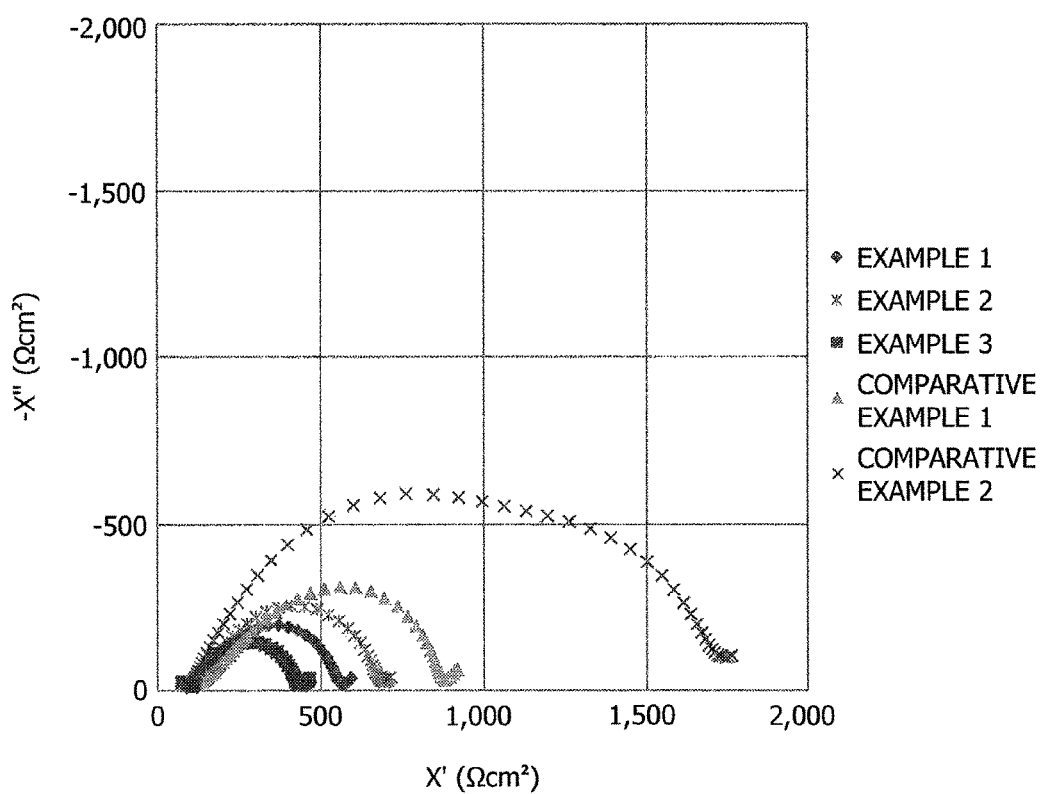
FIG. 2 is a graph showing a result of evaluation of the internal resistance of the all-solid battery according to the embodiment of the present invention.

The all-solid battery according to the embodiment is structured, for example, as shown in FIG. 1 showing a schematic sectional view of the battery.

The illustrated all-solid battery is formed such that both the cathode and the anode have an electrode layer containing an active material and a solid electrolyte. The all-solid battery 1 shown in FIG. 1 has a cathode layer 2A, a anode layer 2B, and a solid electrolyte layer 2C which are laminated one over another while the solid electrolyte layer 2C is interposed between the cathode layer 2A and the anode layer 2B. It should be noted that the cathode layer 2A and the anode layer 2B are connected to current collectors and substrates (both not shown) so that they form electrodes for the all-solid battery.

The cathode layer 2A in the all-solid battery 1 is so structured as to contain a cathode active material particles 10A and a solid electrolyte 20A. Likewise, the anode layer 2B is so structured as to contain an anode active material particles 10B and a solid electrolyte 20B. The solid electrolyte layer 2C is a layer containing the conventional solid electrolyte 30. The cathode active material particles 10A in the cathode layer 2A form an aggregate such that gaps between particles are filled with the solid electrolyte 20A. Likewise, the anode active material particles 10B in the anode layer 2B form an aggregate such that gaps between particles are filled with the solid electrolyte 20B. The all-solid battery (shown in FIG. 1) according to the embodiment is structured such that at least either of the paired electrodes has an electrode layer containing the solid electrolyte which holds the active material particles in close contact with one another. Owing to this structure, the active material particles come into close contact with one another through a solid electrolyte which is deliquescent.

The solid electrolyte in the all-solid battery is prepared from lithium-vanadium oxide which has undergone a reduction treatment so that it is improved in ionic conductivity and electronic conductivity. The reduction treatment is accomplished by heating the oxide in an atmosphere of reducing gas. Examples of the reducing gas include hydrogen gas, ammonia gas, a mixture of hydrogen and ammonia, and a mixture of the reducing gas and argon or nitrogen. The heating for reduction should preferably be performed at 200° C. or above. Heating under 200° C. is not effective for reduction to give lithium-vanadium oxide having high ionic and electronic conductivity.

The lithium-vanadium oxide which has undergone the reduction treatment is subjected to calcination under 500° C. in the atmosphere of air. This calcination gives rise to deliquescent lithium-vanadium oxide having high ionic conductivity and electronic conductivity. Calcination above 500° C. is detrimental to ionic conductivity and electronic conductivity. Thus, calcination in the atmosphere of air should preferably be performed under 500° C.

Reduction of lithium-vanadium oxide may also be accomplished by mixing lithium-vanadium oxide with an organic polar solvent such as N-methylpyrrolidone and acetonitrile. This procedure should preferably be performed at least at the room temperature or at the thermal decomposition temperature or lower of the organic polar solvent to be mixed.

The lithium-vanadium oxide should be filled into the electrode after being deliquesced for reduced internal resistance and increased discharge capacity. The term "deliquescent" used in this specification means that the solid electrolyte deliquesces at a normal temperature (5° C. to 35° C.) in the air. The deliquescent solid electrolyte used for the electrode layer in the all-solid battery forms a dense matrix-like structure which fills gaps between particles of the active material constituting the electrode layer. The solid electrolyte which densely fills gaps between particles of the active material constituting the electrode layer allows the individual particles of the active material to come into contact with one another through surface contact rather than point contact.

The lithium-vanadium oxide provides ionic conductivity attributable to Li ions serving as the carrier for battery reactions. To be more specific, it is desirable for the lithium-vanadium oxide to have an ionic conductivity of no lower than $1 \times 10^{-8}$ S/cm, more preferably no lower than $1 \times 10^{-6}$ S/cm. The lithium-vanadium oxide with an ionic conductivity of no lower than $1 \times 10^{-8}$ S/cm fills gaps between the active material particles, thereby significantly increasing ionic conductivity between the active material particles and between the active material and the solid electrolyte. This permits the all-solid battery to remarkably decrease in internal resistance and to keep a high discharge capacity. This ionic conductivity is a value measured at 20° C.

The lithium-vanadium oxide also provides electronic conductivity attributable to electrons generated by battery reactions. To be more specific, it is desirable for the lithium-vanadium oxide to have an electronic conductivity of no lower than $1 \times 10^{-8}$ S/cm, more preferably no lower than $1 \times 10^{-6}$ S/cm. The lithium-vanadium oxide with an electronic conductivity of no lower than $1 \times 10^{-8}$ S/cm fills gaps between the active material particles, thereby significantly increasing electronic conductivity between the active material particles and between the active material and the lithium-vanadium oxide. This permits the all-solid battery to remarkably decrease in internal resistance and to keep a high discharge capacity. This electronic conductivity is a value measured at 20° C.

The lithium-vanadium oxide exists, while taking on a crystalline form, in the electrode layer of the all-solid battery. Immediately after production, the electrode layer of the all-solid battery is usually placed in an atmosphere isolated from moisture. As a result, the lithium-vanadium oxide remains in a crystalline form without deliquescence; such crystals separate out in gaps between the active material particles, thereby allowing the active material to exhibit high electronic and ionic conductivity between particles.

Examples of the lithium-vanadium oxide include $Li_4V_{10}O_{27}$, $Li_{1.5}V_2O_4$, $Li_{0.9}V_2O_4$, $Li_3VO_4$, $LiV_2O_5$, $Li_{1.11}V_3O_{7.89}$, $LiVO_2$, $Li_{6.1}V_3O_8$, $LiV_2O_4$, $Li_{0.2}V_{1.16}O_2$, $Li_{0.19}VO_2$, $LiV_3O_8$, and $LiVO_3$. It is possible in this embodiment to replace the lithium-vanadium oxide by a material containing lithium-vanadium oxide of a $LiVO_3$ structure which differ in lattice constant from the deliquescent $LiVO_3$. Such a material exhibits high ionic and electronic conductivities, thereby allowing the all-solid battery to effectively decrease in internal resistance and to keep a high discharge capacity.

The lithium-vanadium oxide should be used in an amount of 5 to 50 wt % of the total dry weight of the lithium-vanadium oxide in either the cathode or the anode, the solid electrolyte, and the active material. An amount of 5 wt % or higher is enough for the lithium-vanadium oxide to fill gaps between particles of the active material and between the active material and the solid electrolyte. With the lithium-vanadium oxide in such an amount, the all-solid battery exhibits high ionic and electronic conductivities between particles of the active material and solid electrolyte, which contributes to low internal resistance and high discharge, capacity. By contrast, an amount of 50 wt % or less is effective for the lithium-vanadium oxide to keep the volume of the electrode layer low, which leads to an adequate energy density per volume.

The active material for both the cathode layer and the anode layer may be any one that is used for ordinary solid-state batteries. For example, it may be one that occludes lithium ions if the all-solid battery is a primary battery, and it may be one that is electrochemically active for lithium ions to reversibly undergo intercalation and dissociation if the all-solid battery is a secondary battery.

The cathode active material to be contained in the cathode layer may be a lithium-transition metal compound which includes the following, for example, if the carrier is lithium ions: Those compounds of an olivine type, such as manganese lithium phosphate (LiMnPO$_4$), iron lithium phosphate (LiFePO$_4$), and iron cobalt phosphate (LiCoPO$_4$);

Those compounds of a layer type, such as lithium cobaltate (LiCoO$_2$), lithium nickelate (LiNiO$_2$), lithium manganese (III) dioxide (LiMnO$_2$), and ternary oxide represented by (LiNi$_x$Co$_y$Mn$_z$O$_2$) (in which 0≤x≤1, 0≤y≤1, 0≤z≤1, and x+y+z=1);

Those compounds of a spinel type, such as lithium manganate (LiMn$_2$O$_4$); and Lithium-transition metal compounds of polyanion type, such as vanadium lithium phosphate (Li$_3$V$_2$[PO$_4$]$_3$).

The cathode active material may also be any one of the following compounds if the carrier is sodium ions: Iron oxide sodium (NaFeO$_2$), sodium cobaltate (NaCoO$_2$), sodium nickelate (NaNiO$_2$), sodium manganese (iii) dioxide (NaMnO$_2$), vanadium sodium phosphate (Na$_3$V$_2$[PO$_4$]$_3$), and vanadium sodium phosphate fluoride (Na$_3$V$_2$[PO$_4$]$_2$F$_3$).

Additional examples include: chalcogen compounds, such as copper Chevrel phase compound (Cu$_2$Mo$_6$S$_8$), iron sulfide (FeS, FeS$_2$), cobalt sulfide (CoS), nickel sulfide (NiS, Ni$_3$S$_2$), titanium sulfide (TiS$_2$), and molybdenum sulfide (MoS$_2$); metal oxides, such as TiO$_2$, V$_2$O$_5$, CuO, and MnO$_2$; and C$_6$Cu$_7$FeN$_6$.

The anode active material to be contained in the anode layer may be a lithium-transition metal oxide such as lithium titanate (Li$_4$Ti$_5$O$_{12}$) if the carrier is lithium ions. Additional examples include: alloys, such as TiSi and La$_3$Ni$_2$Sn$_7$; carbonaceous material, such as hard carbon, soft carbon, and graphite; and such metals as lithium, indium, aluminum, tin, and silicon, in the form of simple substance or alloy.

The particles of the active material should preferably be in the form true sphere or elliptic sphere and of a monodisperse type. In addition, the active material should preferably have an average particle diameter of 0.1 to 50 μm. With an average particle diameter of 0.1 μm or larger, the active material in powder form will be rather easy to handle. Moreover, with an average particle diameter of 50 μm or smaller, the active material will have an adequate tap density, which ensures close contact of the active material particles in the electrode layer. The average particle diameter of the active material is obtained by observing an aggregate of particles of the active material under a scanning electron microscope or transmission electron microscope and calculating an arithmetic mean from the diameters of a randomly chosen hundred particles. The particle diameter is a mean value of length and breadth measured with an electron microscope.

The electrode layer may contain the above-mentioned lithium-vanadium oxide together with any other solid electrolyte in general use for solid-state batteries. The solid electrolyte should be one that allows ionic conductivity (or conduction by means of ions serving as the carrier responsible for the battery reaction) and does not deliquesce in the air at the normal temperature (5 to 35° C.). It is desirable to use the solid electrolyte for the electrode layer in the form of mixture with the active material and lithium-vanadium oxide. The electrode layer formed in this way contains the active material and solid electrolyte such that the gaps of their particles are filled with lithium-vanadium oxide. Incorporation of the solid electrolyte into the electrode layer causes lithium-vanadium oxide to improve adhesion and contact not only between particles of the active material but also between particles of the solid electrolyte and between the active material and lithium-vanadium oxide. The result of the improvement is higher ionic conductivity between particles of the active material through the solid electrolyte, which in turn leads to the all-solid battery having an increased discharge capacity.

The solid electrolyte includes that of oxide or sulfide, and α-alumina, the oxide type including that of perovskite structure, NASICON structure, LISICON structure, and garnet structure.

The oxide of perovskite structure includes, for example, Li—La—Ti oxide such as Li$_a$La$_{1-a}$TiO$_3$, Li—La—Ta oxide such as Li$_b$La$_{1-b}$TaO$_3$, and Li—La—Nb oxide such as Li$_c$La$_{1-c}$NbO$_3$ (where 0<a<1, 0<b<1, and 0<c<1).

The oxide of NACICON structure includes, for example, that represented by Li$_m$X$_n$Y$_o$P$_p$O$_q$ whose oikocryst is such crystal as Li$_{l+1}$Al$_l$Ti$_{2-l}$(PO$_4$)$_3$, where X is at least one species of element selected from the group consisting of B, Al, Ga, In, C, Si, Ge, Sn, Sb, and Se; Y is at least one species of element selected from the group consisting of Ti, Zr, Ge, In, Ga, Sn, and Al; O≤l≤1; and each of m, n, o, p, and q is any positive number.

The oxide of LISICON structure includes, for example, those represented by Li$_4$XO$_4$—Li$_3$YO$_4$ (where X is at least one species of element selected from Si, Ge, and Ti; and Y is at least one species of element selected from P, As, and V).

The oxide of garnet structure includes, for example, Li—La—Zr oxide represented by Li$_7$La$_3$Zr$_2$O$_{12}$.

The solid electrolyte of sulfide type includes, for example, Li$_2$S—P$_2$S$_5$, Li$_2$S—SiS$_2$, Li$_{3.25}$P$_{0.25}$Ge$_{0.76}$S$_4$, Li$_{4-r}$Ge$_{1-r}$P$_r$S$_4$ (where O≤r≤1), Li$_7$P$_3$S$_{11}$, and Li$_2$S—SiS$_2$—Li$_3$PO$_4$. The solid electrolyte may be either crystalline one or amorphous one. Moreover, it may be one in which its constituent elements are partly replaced by other elements so long as its crystalline structure is identical. One or more than one solid electrolyte may be used alone or in combination.

The solid electrolyte should have an ionic conductivity of 1×10$^{-6}$ S/cm or higher, preferably 1×10$^{-4}$ S/cm or higher. As long as the solid electrolyte has the ionic conductivity of 1×10$^{-6}$ S/cm or higher, the use of the electrode layer increases ionic conductivity in concert with lithium-vanadium oxide combined with it to ensure close contact between particles. Simultaneously, the electrode layer will be given the high ionic conductivity. This stems from the fact that lithium-vanadium oxide is inferior in crystallinity to the solid electrolyte and tends to be poor in ionic conductivity. It should be noted that the ionic conductivity is a value measured at 20° C.

The electrode layer may contain any conductive agent generally used for ordinary solid-state batteries. Examples of the conductive agent include natural graphite particles, carbon black (such as acetylene black, Ketjen black, furnace black, thermal black, and channel black), carbon fiber, and particles of metal (such as nickel, copper, silver, gold, and platinum) and alloy thereof. One or more than one conductive agent may be used alone or in combination.

The electrode layer may also contain any binder generally used for ordinary solid-state batteries. Examples of the binder include polyvinylidene fluoride (PVDF), polytetrafluoroethylene (PTFE), polyhexafluoropropylene, styrene-butadiene rubber, acrylonitrile-butadiene rubber, ethylene-propylene copolymer, and styrene-ethylene-butadiene copolymer. The binder may be used together with a thickener, such as carboxymethylcellulose and xanthan gum. These binders and thickeners may be used alone or in combination with one another.

The solid electrolyte layer has the conductivity attributable to lithium ions serving as the carrier responsible for battery reactions. It is so structured as to contain any solid electrolyte generally used for ordinary solid-state batteries.

Examples of the solid electrolyte in the solid electrolyte layer include one or more species of the solid electrolyte mentioned early. The solid electrolyte in the solid electrolyte layer may be identical with or different from that in the electrode layer. The all-solid battery according to the embodiment is structured such that the particles of the active material constituting the electrode layer have their gaps densely filled with lithium-vanadium oxide. This structure causes the solid electrolyte and the electrode layer to come into close contact with each other, which results in a decreased surface resistance between layers.

The all-solid battery having the electrode layers and the solid electrolyte layer as mentioned above may also be structured such that the cathode and anode are formed respectively from the cathode layer and the anode layer laminated on a substrate such as a current collector. The electrode to be laminated on a substrate may vary in thickness depending on the structure of the electrode of the all-solid battery. An adequate thickness ranges from 0.1 to 1000 μm. The cathode collector on which the cathode layer is laminated may be a substrate or foil of stainless steel, aluminum, iron, nickel, titanium, and carbon. The anode collector on which the anode layer is laminated may be a substrate or foil of stainless steel, copper, nickel, and carbon.

The following is a description of the electrode for the all-solid battery according to the embodiment. The electrode has a collector and an electrode layer formed thereon. The collector is either that for the cathode or that for the anode. The collector may be in any shape such as rectangular and circular. On either or both sides of the collector is formed the electrode layer.

The electrode layer for the all-solid battery, having the same structure as that mentioned above, contains the active material and lithium-vanadium oxide. Moreover, the electrode layer is formed such that the particles of the active material are in close contact with one another while the gaps thereof is filled with lithium-vanadium oxide. The such-structured electrode layer is bonded to the collector. It is noted that the electrode may additionally contain solid electrolyte (same one as used for the all-solid battery), conducting agent, binder, etc.

The electrode employed in the all-solid battery according to the embodiment will be effectively used for all-solid batteries with a low internal resistance and a high discharge capacity because the particles of the active material have significantly improved electronic conductivity owing to lithium-vanadium oxide filling gaps between them. In addition, because the electrode layer contains lithium-vanadium oxide, the all-solid battery produced under the condition that the water content is so controlled as to permit the lithium-vanadium oxide to partly deliquesce during production will keep the electrode and the solid electrolyte layer in high contact with each other. The step of bonding the electrode layer to the solid electrolyte layer should preferably be followed by heat treatment for drying the battery since residual water will deteriorate the resulting battery.

The following is a description of the method for producing the all-solid battery according to the embodiment. The method consists mainly of a step of preparing an electrode mixture, a step of forming an electrode by heat treatment of the electrode mixture, and a step of bonding together the electrode and the solid electrolyte layer.

The step of preparing the electrode mixture is accomplished by mixing together lithium-vanadium oxide, which has both ionic conductivity and deliquescent properties, and an active material after the lithium-vanadium oxide is subjected to deliquescence. The deliquescing of lithium-vanadium oxide may be accomplished in the air at the normal temperature. This procedure is continued until lithium-vanadium oxide completely dissolves through reaction with moisture in the air and an equilibrium with the air is reached. The deliquesced lithium-vanadium oxide acquires fluidity suitable to form the electrode layer in which the particles of the active material closely adhere together. The deliquescing in this manner prevents the lithium-vanadium oxide from excessively increasing in water content and thereby turning into an aqueous solution. Consequently, the solid electrolyte easily fills up gaps between particles of the active material constituting the electrode layer, thereby establishing close contact between particles of the active material, which leads to high ionic and electronic conductivity. It should be noted that the atmosphere for deliquescence is not specifically restricted in humidity; however, an excessively low humidity may be remedied by adding a small amount of water not enough for its vapor to come to equilibrium with the atmosphere for deliquescing.

After the deliquescing step, the deliquesced lithium-vanadium oxide is incorporated with an active material, followed by being mixed to homogenize the components. In this way the electrode mixture is prepared. This step may also be accompanied by incorporation with a solid electrolyte and a conducting agent contained in the electrode layer. The amount of the lithium-vanadium oxide, when it is dry, should preferably be 5 to 50 parts by weight with respect to the total dry weight of the lithium-vanadium oxide, solid electrolyte, and active material. The lithium-vanadium oxide being mixed in such an amount produces the all-solid battery with a low internal resistance, an adequate volume-energy density, and a high discharge capacity. A binder may also be added in combination with a solvent. Examples of the solvent, which is selected according to the type of the solid electrolyte and binder, includes water, N-methylpyrrolidone, N,N-dimethylformamide, N,N-dimethylacetamide, methanol, ethanol, propanol, ethylene glycol, glycerin, dimethylsulfoxide, and tetrahydrofuran. However, these binder and solvent may be omitted because the deliquesced lithium-vanadium oxide is capable of binding particles together. Mixing to prepare the electrode mixture may be accomplished by means of a homomixer, disperse mixer, planetary mixer, revolving/rotating mixer, or the like suitable for mixing high-viscosity materials.

The electrode mixture prepared as mentioned above undergoes heat treatment so that it is made into the electrode layer containing it in the subsequent step of producing the electrode. The heat treatment may be accomplished in an atmosphere of active gas (such as air) or in an atmosphere of inert gas (such as nitrogen and argon). One or more than one species of gas may be used. The heat treatment of the electrode mixture evaporates water dissolving lithium-vanadium oxide, thereby causing the crystals of lithium-vanadium oxide to separate out around the particles of the active material. This gives rise to a matrixlike structure in which the particles of the active material have their gaps filled with the high-density solid electrolyte. As a result, the particles of the active material are in close contact with one another through the solid electrolyte, which realizes high ionic conductivity.

The heat treatment may be accomplished at any temperature depending on the composition of the electrode mixture. Adequate temperatures range from 15 to 650° C., preferably from 100 to 300° C. A heating temperature of 15° C. or over is high enough to readily evaporate and remove water from lithium-vanadium oxide for drying in the air. A heating temperature of 650° C. or below is low enough to protect the electrode active material and the solid electrolyte from solid phase reactions. This prevents the formation of heterogeneous phases poor in ionic conductivity and avoids the increase of internal resistance. A heating temperature from 100 to 300° C. is desirable to sufficiently exclude water from lithium-vanadium oxide while avoiding the increase of internal resistance. The excluded water permits the formation of the electrode layer that contributes to a high capacity.

After the heat treatment, the electrode mixture is formed into the electrode layer which may have any shape (such as rectangle and circle) suitable for the all-solid battery. The forming step may be accomplished by pressing under a pressure of 5 to 200 MPa; an adequate pressure should be selected to avoid the occurrence of grain boundaries which could break the electrode mixture. It is noted that the electrode layer including the electrode mixture may be bonded to the collector to produce the electrode for the all-solid battery. This step may be accomplished by applying the electrode mixture onto the collector, followed by way of the heat treatment, or by uniting the electrode layer and the collector into one by fusion bonding. Coating with the electrode mixture may be accomplished by wet coating with a roll coater, bar coater, doctor blade, or the like.

In the subsequent step, the electrodes prepared as mentioned above are paired and bonded together, with the solid electrolyte layer interposed between them. In other words, the cathode layer incorporated with lithium-vanadium oxide is paired with the anode layer and bonded to the solid electrolyte layer under pressure which is interposed between the two electrode layers. In addition, the anode layer incorporated with lithium-vanadium oxide is paired with the cathode layer and bonded to the solid electrolyte layer under pressure which is interposed between the two electrode layers. Alternatively, the cathode layer and the anode layer, both incorporated with lithium-vanadium oxide, are paired with each other and bonded under pressure to the solid electrolyte layer interposed between the two electrode layers such that one surface thereof faces the cathode layer and another surface thereof faces the anode layer. The part assembled from the electrode layers and the solid electrolyte layer as mentioned above is provided with output terminals for power delivery from the all-solid battery. The output terminals may be made of aluminum having resistance to voltage and welded to the collector. The resulting electrode assembly is enclosed in a casing (of a rectangular, square, coin, or laminate type), with an insulating material interposed between them, thereby giving the all-solid battery.

The all-solid battery produced as mentioned above functions as an all-solid primary battery capable of irreversible discharging or functions as an all-solid secondary battery capable of reversible charging and discharging, depending on the electrode layer and active material selected. The all-solid secondary battery is particularly useful as the power source for household and industrial electric appliances, portable information and communication equipment, power storage systems, ships, railway vehicles, aircraft, hybrid automobiles, and electric cars. The electrode layers and solid electrolyte layer of the all-solid battery may be examined for their composition and structure by use of X-ray photoelectron spectroscopy, induction coupled plasma emission spectroscopy, X-ray fluorescence analysis, or X-ray diffractometry.

EXAMPLES

The present invention will be descried below in more detail with reference to Examples which are not intended to restrict the scope thereof.

Samples of the all-solid battery were prepared with the lithium-vanadium oxide which had undergone a reduction treatment as described in Examples that follow, and they were examined for internal resistance and discharge capacity.

Example 1

In this example, electrodes for all-solid battery were prepared with lithium-vanadium oxide which had undergone a reduction treatment with hydrogen gas as follows and thereafter an all-solid battery provided with the electrodes was produced as follows.

The process started with uniformly mixing in a mortar 1.85 g of lithium carbonate ($Li_2CO_3$) and 4.55 g of divanadium pentaoxide ($V_2O_5$). The resulting mixture was transferred to a quartz boat, having 10 mm in outside diameter, and then underwent heat treatment in a tubular electric furnace. This heat treatment was performed in an atmosphere of hydrogen gas in such a way that the temperature was raised to 800° C. at a rate of 10° C. per minute and this temperature was held for three hours. After this heat treatment, the mixture was cooled to 100° C. and then underwent a second heat treatment for calcination. In this heat treatment, the temperature was raised to 450° C. at a rate of 10° C. per minute and this temperature was held for an hour. After this heat treatment, the mixture was cooled to 100° C. to give lithium-vanadium oxide desired.

The resulting lithium-vanadium oxide (as much as 30 wt % of the dry weight of the electrode) was allowed to deliquesce in the air. The lithium-vanadium oxide which had deliquesced was uniformly mixed with $LiCoO_2$ particles to give the electrode mixture. The thus-obtained electrode mixture was applied onto the collector of aluminum foil. This step was followed by heat treatment at 100° C. for two hours to remove water. After the electrode mixture was punched into a disc with an area of 1 $cm^2$, there was obtained a cathode.

The anode was prepared by punching lithium foil and copper foil (press-bonded together) into a disc with an area of 1 $cm^2$. Also, a solid electrolyte layer in circular form was prepared from 0.1 g of LATP by press-forming (under a pressure of 10 MPa) in a circular die of stainless steel having a sectional area of 1 $cm^2$. The thus-obtained cathode, anode, and solid electrolyte layer were placed one over another, with the last interposed between the first two, and they were pressed under a pressure of 10 MPa for a minute to give a bonded electrode. The electrode was held between separators of insulating material such that the cathode and anode are in contact with the separators. The resulting assembly was enclosed in a casing of stainless steel, which was subsequently crimped with a torque of 15 N·m. Thus, there was obtained an all-solid battery according to Example 1.

Example 2

The same process as in Example 1 was repeated except that the first calcination step was performed in an atmosphere of ammonia gas.

Example 3

The process started with uniformly mixing in a mortar 1.85 g of lithium carbonate ($Li_2CO_3$) and 4.55 g of divanadium pentaoxide ($V_2O_5$). The resulting mixture was transferred into a platinum crucible and underwent heat treatment in an electric furnace of a box type. This heat treatment was performed in the air in such a way that the temperature was raised to 650° C. at a rate of 10° C. per minute and this temperature was held for ten hours. After this heat treatment, 2 g of the mixture was placed in 2 g of water for dissolution with stirring at about 50° C. The resulting solution was stirred with 3.0 g of 1-methylpyrrolidone for seventy two hours at a room temperature. Thus there was obtained a binder solution containing lithium-vanadium oxide.

Subsequently, the binder solution (0.7 g) was uniformly mixed with $LiCoO_2$ particles serving as the active material to give the electrode mixture. The thus-obtained electrode mixture was applied onto the collector of aluminum foil. This step was followed by heat treatment at 150° C. for two hours to remove solvent. After the electrode mixture was punched into a disc with an area of 1 $cm^2$, there was obtained a cathode.

The anode was prepared by punching lithium foil and copper foil (press-bonded together) into a disc with an area of 1 $cm^2$. Also, a solid electrolyte layer in circular form was prepared from 0.1 g of LATP by press-forming (under a pressure of 10 MPa) in a circular die of stainless steel having a sectional area of 1 $cm^2$. The thus-obtained cathode, anode, and solid electrolyte layer were placed one over another, with the last interposed between the first two, and they were pressed under a pressure of 10 MPa for a minute to give a bonded electrode. The electrode was held between separators of insulating material such that the cathode and anode were in contact with the separators. The resulting assembly was enclosed in a casing of stainless steel, which was subsequently crimped with a torque of 15 N·m. Thus, there was obtained an all-solid battery according to Example 3.

Comparative Example 1

The same process as in Example 1 was repeated to produce the all-solid battery except that lithium-vanadium oxide was replaced by the one that did not undergo reduction treatment.

Comparative Example 2

The same process as in Example 1 was repeated to produce the all-solid battery except that the cathode was replaced by the one that was prepared as follows. $LiCoO_2$ as the cathode active material and polyvinylidene fluoride (PVDF) as the binder were uniformly mixed together. PVDF is an insulating material having neither electronic conductivity nor ionic conductivity. The amount of these two components was 30 wt % of the dry weight of the electrode. The thus-obtained electrode mixture was applied onto the collector of aluminum foil. This step was followed by heat treatment at 100° C. for two hours to remove water. After the electrode mixture was punched into a disc with an area of 1 $cm^2$, there was obtained a cathode.

The samples of the all-solid batteries prepared in Examples 1 to 3 and Comparative Examples 1 and 2 were examined for discharge capacity and internal resistance by way of the alternating current impedance method at 25° C. with an AC voltage of 10 mV and frequencies of 1 MHz to 0.1 Hz. The discharge capacity was measured by charging the battery up to the final voltage of 4.25 V with constant current and constant voltage, allowing the battery to stand for a while, and discharging the battery down to the final voltage of 3.0 V with constant current. The results of the measurement of internal resistance and discharge capacity are shown in Table 1.

TABLE 1

| | Discharge capacity (mAh/g) | Internal resistance (kΩ · $cm^2$) |
|---|---|---|
| Example 1 | 110 | 0.6 |
| Example 2 | 113 | 0.7 |
| Example 3 | 122 | 0.5 |
| Comparative Example 1 | 80 | 0.9 |
| Comparative Example 2 | 75 | 2.0 |

It is noted from Table 1 that the samples in Examples 1 to 3 are superior in discharge capacity to the sample in Comparative Example 1, in which lithium-vanadium oxide without being subjected to a reduction treatment is used, and the sample in Comparative Example 2, in which an insulating binder is used. Moreover, the samples in Examples 1 to 3 have an internal resistance which is about a half of the normal value. Thus, they were found to exhibit high performance ordinarily required.

Comparison between Examples 1 to 3 and Comparative Examples 1 and 2 reveals that lithium-vanadium oxide, having high electronic conductivity and ionic conductivity, increases discharge capacity and decreases internal resistance. The all-solid battery has a reduced internal resistance and an increased discharge capacity if its electrode is filled with lithium-vanadium oxide which has undergone the reduction treatment.

What is claimed is:

1. A method for producing an electrode for an all-solid battery, the method comprising:
   a step of reducing a lithium-vanadium oxide by heating the oxide inside a reducing gas;
   a step of causing the reduced lithium-vanadium oxide to deliquesce;
   a step of mixing the deliquesced lithium-vanadium oxide with an active material so as to prepare an electrode mixture; and
   a step of making the electrode mixture into an electrode by virtue of molding after heat treatment to the electrode mixture.

2. The method of claim 1, wherein the reducing gas includes at least one species selected from hydrogen gas and ammonia gas.

3. The method of claim 1, wherein the step of reducing the lithium-vanadium oxide is performed at a temperature of 200° C. or higher.

4. The method of claim 1, wherein the step of causing the lithium-vanadium oxide to deliquesce is preceded by a step of heating the reduced lithium-vanadium oxide in the air at a temperature of 500° C. or lower.

5. The method of claim 1, wherein the step of reducing the lithium-vanadium oxide is preceded by a step of mixing the lithium-vanadium oxide with an organic solvent.

6. The method of claim 5, wherein the organic solvent includes at least one species selected from N-methylpyrrolidone and acetonitrile.

7. The method of claim 1, wherein the lithium-vanadium oxide includes at least one species selected from $Li_4V_{10}O_{27}$, $Li_{1.5}V_2O_4$, $Li_{0.9}V_2O_4$, $Li_3VO_4$, $LiV_2O_5$, $Li_{1.11}V_3O_{7.89}$, $LiVO_2$, $Li_{6.1}V_3O_8$, $LiV_2O_4$, $Li_{0.2}V_{1.16}O_2$, $Li_{0.19}VO_2$, $LiV_3O_8$, and $LiVO_3$.

8. A method for producing an all-solid battery, the method comprising:
- a step of reducing a lithium-vanadium oxide by heating the oxide in a reducing gas;
- a step of causing the reduced lithium-vanadium oxide to deliquesce;
- a step of mixing the deliquesced lithium-vanadium oxide with an active material so as to prepare an electrode mixture;
- a step of making the electrode mixture into an electrode by virtue of molding after heat treatment to the electrode mixture; and
- a step of bonding the thus-made electrode to a solid electrode layer in such a way that the solid electrode layer is interposed between the electrode and either of cathode and anode to be paired with the electrode.

9. The method of claim 8, wherein the reducing gas includes at least one species selected from hydrogen gas and ammonia gas.

10. The method of claim 8, wherein the step of reducing the lithium-vanadium oxide is performed at a temperature of 200° C. or higher.

11. The method of claim 8, wherein the step of causing the lithium-vanadium oxide to deliquesce is preceded by a step of heating the reduced lithium-vanadium oxide in the air at a temperature of 500° C. or lower.

12. The method of claim 8, wherein the step of reducing the lithium-vanadium oxide is preceded by a step of mixing the lithium-vanadium oxide with an organic solvent.

13. The method of claim 12, wherein the organic solvent includes at least one species selected from N-methylpyrrolidone and acetonitrile.

14. The method of claim 8, wherein the lithium-vanadium oxide includes at least one species selected from $Li_4V_{10}O_{27}$, $Li_{1.5}V_2O_4$, $Li_{0.9}V_2O_4$, $Li_3VO_4$, $LiV_2O_5$, $Li_{1.11}V_3O_{7.89}$, $LiVO_2$, $Li_{6.1}V_3O_8$, $LiV_2O_4$, $Li_{0.2}V_{1.16}O_2$, $Li_{0.19}VO_2$, $LiV_3O_8$, and $LiVO_3$.

* * * * *